May 27, 1930. R. C. MATHES 1,760,159
ELECTROOPTICAL IMAGE PRODUCTION
Filed July 24, 1928
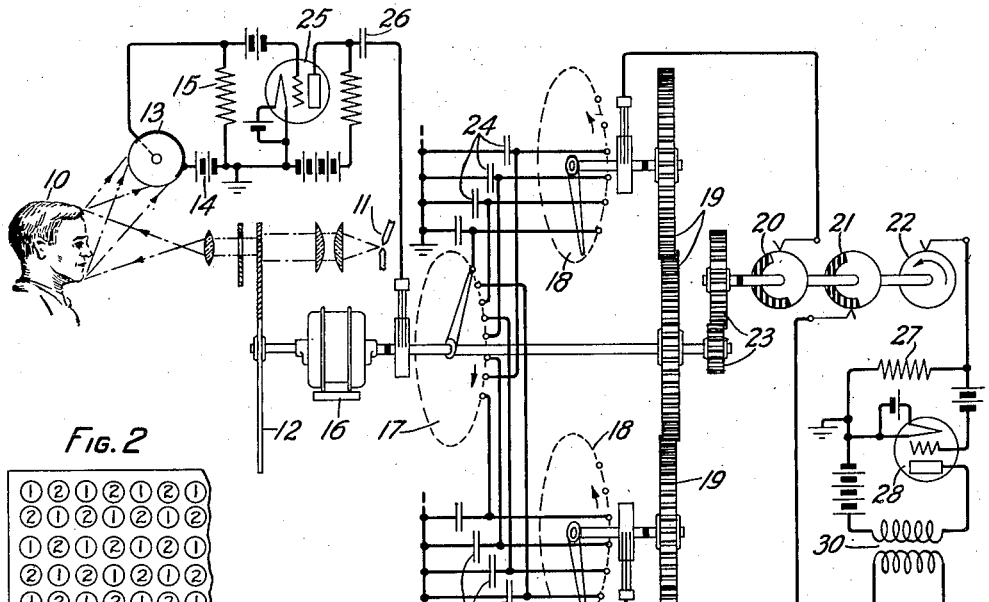
Fig. 1
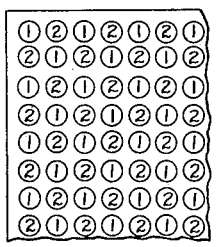
Fig. 2
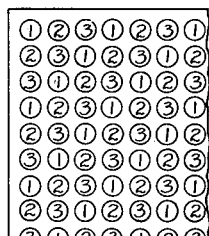
Fig. 3
Fig. 4
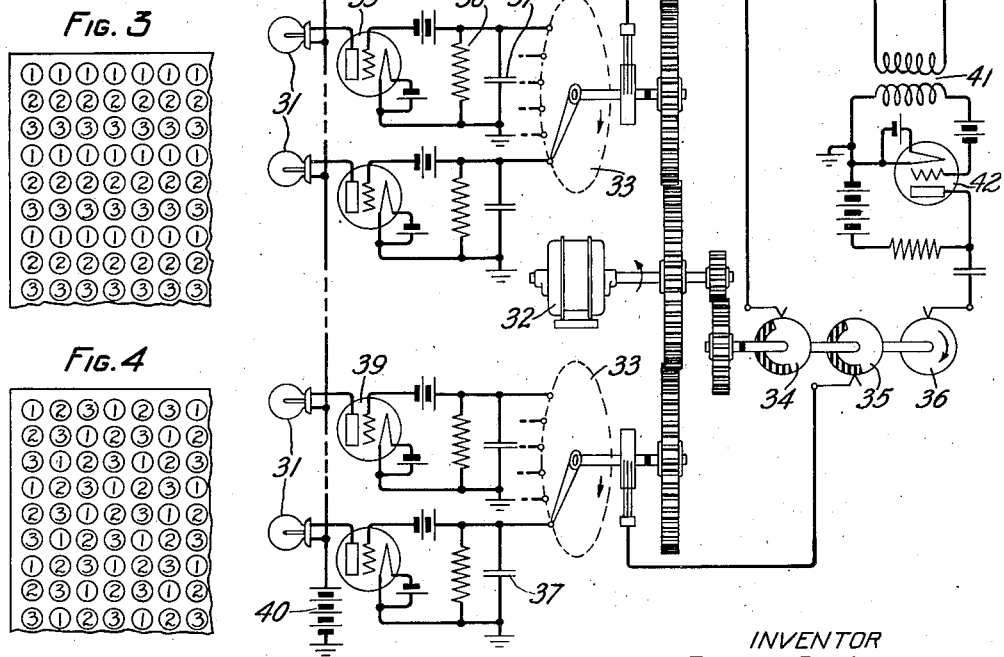
INVENTOR
Robert C. Mathes
BY
O. E. Sprague.
ATTORNEY Patented May 27, 1930

1,760,159

UNITED STATES PATENT OFFICE

ROBERT C. MATHES, OF WYOMING, NEW JERSEY, ASSIGNOR TO BELL TELEPHONE LABORATORIES, INCORPORATED, OF NEW YORK, N. Y., A CORPORATION OF NEW YORK

ELECTROOPTICAL IMAGE PRODUCTION

Application filed July 24, 1928. Serial No. 295,058.

This invention relates to electro-optical image production and particularly to methods and apparatus for producing images electro-optically.

An object of the invention is to improve the quality of an image produced electro-optically.

There has heretofore been proposed an electro-optical system in which a picture is completely scanned in a plurality of lines, the successive lines being separated by areas which are subsequently scanned during the same scannning period. The elements of the image are produced in the same order as the corresponding elements of the picture are scanned and the elements occupy the same positions for each scanning period with respect to the field as a whole.

In accordance with a feature of the present invention a field of view is scanned periodically and means are provided for producing an image of the field of view made up of of elements set up during each full scanning period, these elements occupying positions for each period different than for the preceding or following periods with respect to the field as a whole.

In accordance with an embodiment of the invention shown and described herein, an image impulse corresponding to each elemental area of a field of view is impressed on one of a bank of condensers. At the receiving station there is employed an image producing apparatus comprising a plurality of groups of elemental areas or light emitting elements, the elements of the different groups forming a pattern of completely intermeshed elemental areas. The condensers at the transmitting station are divided into groups corresponding to the groups of elemental areas of the image producing device and a distributor is employed for impressing the potentials to which the condensers of one of the groups are charged on a transmission channel during the period required for a complete scanning of the field of view. The image impulses stored in the different groups of condensers are transmitted in succession. Thus only a portion of the image current impulses corresponding to the tone values of the elemental areas of the field of view and produced during each scanning cycle is transmitted and consequently the frequency range of the transmitted image current is relatively narrow with respect to the frequency range of the current produced as a result of scanning. The received image current impulses are impressed on the image producing device to actuate first the elemental areas of one group in succession and then the elemental areas of another group in succession. The actuation of each of the elements of the image producing device is preferably sustained for a period during which the actuation of the other elements takes place in accordance with feaures of a copending application of H. E. Ives and R. C. Mathes, Serial No. 232,768, filed November 12, 1927 and a copending application of R. C. Mathes, Serial No. 232,751, filed November 12, 1927.

In the drawing, Fig. 1 shows diagrammatically a television system embodying features of this invention, and Figs. 2 to 4 show various grouping arrangements for the light emitting elements of the image producing device.

Referring to Fig. 1 of the drawing the elemental areas of the field of view comprising the subject 10 are illuminated in succession along a plurality of parallel lines by light from the source 11 passing through the spirally arranged apertures in the revolving discs 12. Light reflected from the successively illuminated elemental areas of the subject 10 reaches the light sensitive surface of a photoelectric cell 13 and causes the current from the scource 14 flowing through the cell and resistance 15 to vary in amplitude in accordance with the intensity variations of the reflected light. The motor 16 which drives the scanning disc 12 also drives the distributor 17 which has a plurality of contacts, one for each elemental area of the field of view being scanned, and the distributors 18 each of which has contacts corresponding to a group of elemental areas. The scanning disc 12 and the rotatable brush of the distributor 17 are coupled directly to the motor shaft. The brushes of the distributor 18 are shown coupled to the shaft through the gears 19 to facilitate their showing, but it is preferable to connect them directly to the shaft. The discs 20, 21 and 22 of conducting material, except for the shaded segments extending halfway around the circumferences of the discs 20 and 21, are coupled to the motor shaft through gears 23 and run at an angular velocity one-half as great as the velocity of the scanning disc 12 and of the distributors 17 and 18.

As the field of view is scanned the varying voltage drop across the resistance 15, corresponding to the tone values of the successively scanned elemental areas of the field of view, is amplified by the electric discharge amplifier 25. A plurality of condensers 24, one corresponding to each elemental area of the field of view, are provided for storing charges corresponding to the varying image current, that is, each condenser, as it is connected to the anode circuit of the electric discharge amplifier 25 through the distributor 17 and blocking condenser 26, is charged to a potential corresponding to the potential existing between the anode and cathode of the electric discharge amplifier at the time that the elemental area to which this condenser corresponds, is being scanned. The condensers 24 are arranged in a plurality of groups, there being two groups shown in the drawing. The potentials of the charges stored in the condensers comprising one of the groups are impressed in succession across the impedance element 27, which is preferably largely resistive, through one of the distributors 18 and the discs 20 and 22 when the conducting portion of disc 20 is in contact with its associated brush. Similarly the potentials stored in the other group of condensers are impressed across the impedance 27 through the other distributor 18 and the discs 21 and 22 when the conducting portion of disc 21 is in contact with its associated brush. The impedance 27 is connected across the cathode and the control electrode of an electric discharge amplifier 28. The anode circuit of this electric discharge amplifier is connected to a transmission channel 29 through a transformer 30.

At the receiving station there is provided an image producing device comprising a plurality of groups of light emitting elements, such as the lamps 31, each element corresponding to an elemental area of the field of view and to one of the condensers 24 at the transmitting station, and each group of elements corresponding to a group of the condensers 24. The motor 32 which may be maintained in synchronism with the motor 16 at the transmitting station by any suitable arrangement such as that disclosed in a co-pending application of H. M. Stoller and E. R. Morton, Serial No. 200,799, filed June 23, 1927, drives the rotatable brushes of the distributors 33, corresponding to the distributors 18, and the discs 34, 35 and 36 corresponding to the discs 20, 21 and 22 respectively. When the conducting portions of the discs 20 and 34 are in contact with their associated brushes, current impulses, corresponding to the potentials of the charges stored in the condensers 24 of one of the groups of condensers at the transmitting station, are transmitted over the transmission channel 29 and through the transformer 41 and the amplifier 42 at the receiving station for similarly charging condensers 37 of a corresponding group of condensers at the receiving station. During the succeeding scanning cycle when the brushes associated with the discs 21 and 35 are in contact with the conducting portions thereof, the condensers 37 of a different group of condensers at the receiving station, are charged to correspond to the charges stored in the condensers 24 of a different group of condensers at the transmitting station. Each condenser 37, in shunt with a resistance element 38, is connected to the control electrode and cathode of one of a plurality of electric discharge devices 39, in the anode circuit of which is connected one of the light emitting elements 31. A source of current 40 is connected to the anode of each electric discharge device 39 through one of the lamps 31. The current flowing through each light emitting element 31, and therefore the intensity of the light emitted thereby, is thus varied in accordance with the potential of the charge stored in the condenser 37 associated therewith. It is thus apparent that during one scanning cycle the light emitting elements of one of the groups are actuated in accordance with an instantaneous aspect of the field of view while during a succeeding scanning cycle the light emitting elements of a different group are actuated in accordance with a succeeding instantaneous aspect. While the actuation of the light emitting elements may be momentary, it is preferable to sustain the actuation of each element for a period overlapping the actuation of other elements. The actuation of each element may be sustained in accordance with the one instantaneous aspect of the corresponding element of the field of view until it is actuated in accordance with a different aspect or its actuation may be sustained for the time required for completely scanning the field of view.

The system shown in Fig. 1 employs two groups of light emitting elements 31 and corresponding groups of condensers 24 and 37. However, any number of groups may be employed. For example, if three groups are employed instead of two, it will only be necessary to change the arrangement shown by substituting for the two pairs of discs 20 and 21, and 34 and 35, which rotate at half the scanning speed and which have a peripheral portion one half of which is conducting, three pairs of discs which rotate at one-third the scanning speed and which have a peripheral portion one-third of which is conducting.

The elements of the image producing device are preferably so arranged that the elements of the different groups form a pattern of completely intermeshed elemental areas. When two groups of elements are employed, for example, the elements may be arranged as indicated in Fig. 2, the numeral 1 designating the elements of one group and the numeral 2 designating the elements of the second group. Figs. 2 and 3 show grouping arrangements which may be employed when there are three groups of elements. In these figures the elements of different groups are arranged in consecutive rows which run parallel to the edge of the image in the arrangement shown in Fig. 3 and angularly with respect to the edge in the arrangement shown in Fig. 4.

In the system just described, current impulses corresponding to the tone values of successively scanned elemental areas of a field of view are produced during each scanning cycle but only a portion of these impulses corresponding to a group of the elemental areas scanned are transmitted for controlling the production of a single aspect of the image. During a succeeding scanning cycle current impulses corresponding to the tone values of a different group of elemental areas are transmitted for actuating corresponding elements of an image producing device in accordance with a different aspect of the field of view. The frequency range which it is necessary to transmit over the channel 29 is approximately equal to the number of elemental areas scanned per second divided by the number of groups of elements employed in the image producing device. While it is sometimes preferable to sustain the actuation of the image producing elements, these elements may be actuated momentarily. It is possible, of course, to employ mechanical or other devices for storing energy corresponding to the image current impulses in place of condensers.

There is disclosed in my copending application Serial No. 295,057, filed July 24, 1928, a television system, similar in some respects to that shown in Fig. 1, in which an electromotive force which varies in accordance with the tone values of successively scanned elemental areas of a field of view is impressed on a plurality of condensers one at a time at a predetermined rate and in which the condensers are discharged in succession at a different rate for controlling the production of an image.

What is claimed is:

1. In an electro-optical image producing system, means for periodically scanning a field of view, image producing apparatus, and means for actuating said image producing apparatus to produce an image of said field of view made up of line series of elemental areas set up in the same order from one side of the image field to the opposite side during each full scanning period, which elemental areas occupy positions for each period different than for the preceding and following periods with respect to the image field as a whole.

2. In an electro-optical image producing system, means for scanning the elemental areas of a field of view cyclically in succession to produce an image current, an image producing device comprising a plurality of groups of elements, and means for actuating the elements of one group only during one scanning period and another group in the same general order during a succeeding scanning period.

3. In an electro-optical image producing system, means for scanning the elemental areas of a field of view cyclically in succession to produce image current impulses corresponding to the tone values of the elemental areas, and means for impressing on an image producing device only a portion of the impulses produced during each scanning cycle.

4. The method of producing images electro-optically which comprises scanning the elemental areas of a field of view cyclically in succession to produce image current impulses corresponding to the tone values of the elemental areas, utilizing only a portion of the impulses produced during each scanning cycle for controlling the production of an image, and periodically varying the portion of the impulses utilized.

5. An electro-optical image producing system comprising means for illuminating the elemental areas of a field of view in succession, light sensitive means for receiving light from each elemental area as it is scanned for producing an image current corresponding to the tone values of the elemental areas, image producing apparatus, means for utilizing energy derived from said image current for controlling the actuation of said image producing apparatus to produce an image of said field of view made up of elemental areas set up during each full scanning period, which elemental areas occupy positions for each period different than for the preceding or following periods with respect to the field as a whole.

6. An electro-optical image producing system comprising means for scanning the elemental areas of a field of view cyclically in succession to produce image current impulses corresponding to the tone values of the successively scanned elemental areas, means for storing in a plurality of elements energy corresponding to said current impulses, means for transmitting during each scanning cycle current corresponding to the energy stored in a portion of said elements, and means for utilizing said transmitted current for controlling the production of an image of said field of view.

7. An electro-optical image producing system comprising means for scanning the elemental areas of a field of view cyclically in succession to produce image current impulses corresponding to the tone values of the elemental areas, means for transmitting during each scanning cycle a current corresponding to a portion of said image current impulses, means for storing energy corresponding to said transmitted current, and means responsive to said stored energy for controlling the production of the image.

8. In an electro-optical image producing system, means for scanning a field of view, an image producing device comprising a plurality of groups of light emitting elements for producing an image of said field of view, means for actuating only the elements of one group in succession during one scanning period and subsequently only the elements of another group in succession, during a succeeding scanning period, and means for sustaining the actuation of each element for a period during which the actuation of other elements takes place.

9. In an electro-optical image producing system, an image producing device comprising a plurality of groups of light emitting elements, the elements of the different groups forming a pattern of completely intermeshed elemental areas, means for actuating the elements of one group in succession and subsequently the elements of another group in succession, and means for sustaining the actuation of each element for a period during which the actuation of other elements takes place.

10. In an electro-optical image producing system, means for scanning the elemental areas of a field of view cyclically in succession, an image producing device comprising a plurality of groups of light emitting elements, means for actuating the elements of one group in succession in accordance with one instantaneous aspect of the field of view and subsequently the elements of another group in succession in accordance with a succeeding aspect of the field of view, and means for sustaining the actuation of each element for a period during which the actuation of other elements takes place.

11. An electro-optical image producing system comprising means for illuminating the elemental areas of a field of view in succession, a light sensitive element for receiving light reflected from the elemental areas for producing a varying potential corresponding to the tone values of the successively scanned elemental areas, a plurality of condenser elements comprising several groups, a distributor for impressing said potentials on said condensers in succession for charging them, a transmission channel, a plurality of distributors, one associated with each group of condenser elements for impressing the potentials to which the condenser elements are charged on said transmission channel, the potentials stored in the condenser elements of different groups being impressed on the transmission channel during different scanning cycles respectively, a plurality of distributors for impressing the potentials of the transmitted current impulses on a plurality of condenser elements corresponding to the aforementioned condenser elements, a bank of light emitting elements, and means for utilizing the potentials stored in said last mentioned condenser elements for controlling the actuation of said bank of light emitting elements for producing an image of the field of view.

In witness whereof, I hereunto subscribe my name this 20th day of July, 1928.

ROBERT C. MATHES.

DISCLAIMER 1,760,159.—*Robert C. Mathes,* Wyoming, N. J. ELECTROOPTICAL IMAGE PRODUCTION. Patent dated May 27, 1930. Disclaimer filed June 30, 1936, by the assignee, *Bell Telephone Laboratories, Incorporated.*

Hereby disclaims from the combination recited in claim 2 of said Letters Patent all image producing devices comprising a plurality of groups of elements except such devices wherein said elements are light emitting.

[*Official Gazette July 21, 1936.*]